United States Patent [19]

Loschelder et al.

[11] Patent Number: 5,492,149
[45] Date of Patent: Feb. 20, 1996

[54] PUSHBUTTON ACTIVATED WATER PRESSURE BALANCED MIXING VALVE

[75] Inventors: Todd C. Loschelder, Macedonia; Erwin F. Mikol, Westlake, both of Ohio

[73] Assignee: Moen Incorporated, North Olmsted, Ohio

[21] Appl. No.: 406,481

[22] Filed: Mar. 20, 1995

[51] Int. Cl.⁶ .................................................... F16K 11/07
[52] U.S. Cl. ................................. 137/625.4; 137/625.48
[58] Field of Search ........................... 137/625.4, 625.48, 137/625.5

[56] References Cited

U.S. PATENT DOCUMENTS

| | | | |
|---|---|---|---|
| 2,802,484 | 8/1957 | Sheets | 137/625.4 |
| 2,870,789 | 1/1959 | Bilaisis . | |
| 3,224,278 | 11/1965 | Reid et al. . | |
| 3,565,101 | 2/1971 | Aslan . | |
| 3,896,836 | 7/1975 | Lobarre | 137/625.4 X |
| 3,904,167 | 9/1975 | Touch et al. . | |
| 4,014,509 | 3/1977 | Yoshino et al. . | |
| 4,189,792 | 2/1980 | Veach . | |
| 4,356,842 | 11/1982 | Gassert . | |
| 4,901,750 | 2/1990 | Nicklas et al. . | |
| 5,038,827 | 8/1991 | Heffner et al. . | |
| 5,186,213 | 2/1993 | Urata et al. . | |

*Primary Examiner*—John C. Fox
*Attorney, Agent, or Firm*—Dorn, McEachran, Jambor & Keating

[57] ABSTRACT

A pushbutton activated water pressure balanced mixing valve for faucets and shower/tub discharge controls includes a housing, a valve sleeve having hot and cold water inlets and a mixed water discharge and a valve member. The valve member has a hot water passage communicable with the sleeve hot water inlets and the sleeve mixed water discharge and a cold water passage communicable With the sleeve cold water inlet and the sleeve mixed water discharge. The housing has an outlet connected to the sleeve mixed water discharge. The valve member has generally equal pressure balancing surfaces and there is a passage in the housing connected to the sleeve discharge and to each of the pressure balancing surfaces for applying water pressure onto the surfaces for causing water temperature modulation movement of the valve member within the sleeve. There is also a passage connecting each of the pressure balancing surfaces with the housing outlet. There are manually operable check valves in each of the passages connecting the pressure balancing surfaces and the housing outlets. Operation of one of the check valves reduces the water pressure applied to one of the pressure balancing surfaces causing the valve member to move within the valve sleeve changing the extent of communication of each of the sleeve hot and cold water inlets with the sleeve mixed water discharge to vary the water temperature thereof.

12 Claims, 2 Drawing Sheets

5,492,149

PUSHBUTTON ACTIVATED WATER PRESSURE BALANCED MIXING VALVE

THE FIELD OF THE INVENTION

The present invention relates to mixing valves of the type customarily found in kitchen and lavatory faucets, as well as in shower/tub controls. Traditionally, such mixing valves have been operated by a knob or lever which rotates, reciprocates, or otherwise moves the valve stem or valve member to control both the temperature and volume of water passing from the mixing valve. The present invention relates to a mixing valve which eliminates the use of a manual knob or lever and instead provides a pair of pushbuttons, one for hot water and one for cold water, with the pushbuttons being effective to utilize the water supply pressure as the energy to hydraulically move the valve member. This has the advantage of reducing the high actuation force which is typically associated with mixing valves of the type described. The mixing valve will stay in an adjusted position, when there is no pushbutton activation, and the valve will similarly stay in a particular position after the water is shut off. When the water is again turned on, there will be no movement of the mixing valve and the temperature setting will remain as prior to shutoff.

SUMMARY OF THE INVENTION

The present invention relates to faucet mixing valves and in particular to a valve which is mechanically moved by using the water supply pressure as the activating force.

A primary purpose of the invention is a mixing valve for use in faucets and shower/tub controls in which the movable valve member is hydraulically activated by water supply pressure.

Another purpose is a mixing valve of the type described which is operated with reduced actuating force.

Another purpose is a mixing valve as described using manually operable check valves as the means for changing water temperature.

Another purpose is a pushbutton activated water pressure balanced mixing valve which uses supply pressure to move the valve member and which will remain at a desired mixing valve setting even when the valve is shut off.

Another purpose is a mixing valve as described which has no dynamic seals.

Another purpose is a mixing valve of the type described which may be remotely located from the faucet spout or other type of discharge.

Another purpose is a mixing valve which utilizes no exterior knobs or handles for operation, is solely operated by pushbuttons which may be remotely located from the water discharge.

Another purpose is a mixing valve as described which eliminates the customary knobs or levers for manual valve operation.

Other purposes will appear in the ensuing specification, drawings and claims.

BRIEF DESCRIPTION OF THE DRAWINGS

The invention is illustrated diagrammatically in the following drawings wherein.

DESCRIPTION OF THE PREFERRED EMBODIMENT

Figure 1:
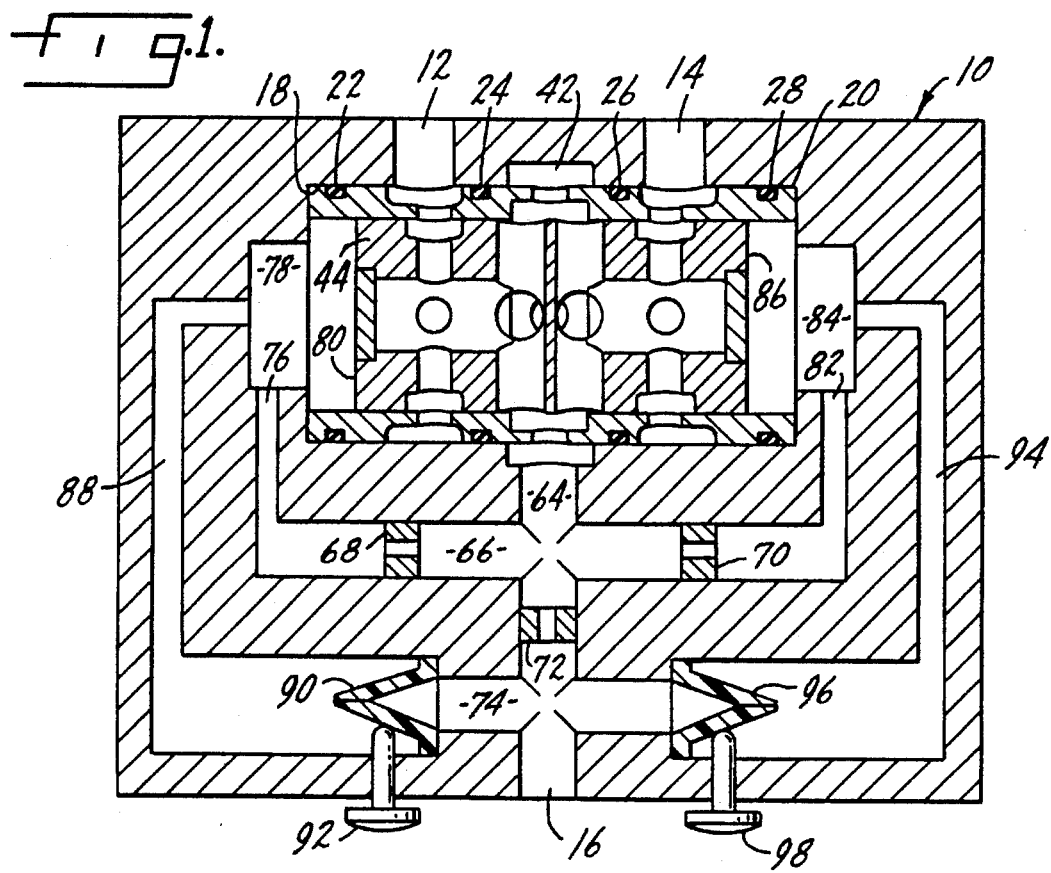
FIG. 1 is a diagrammatic illustration of the mixing valve disclosed herein.
Figure 2:
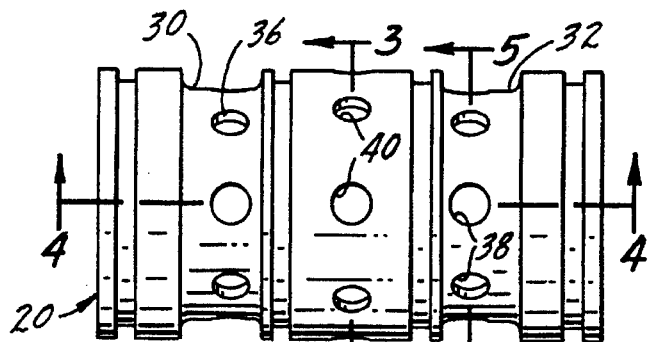
FIG. 2 is a side view of the sleeve.
Figure 3:
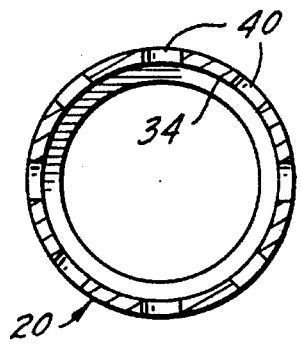
FIG. 3 is a section along plane 3—3 of FIG. 2.
Figure 4:
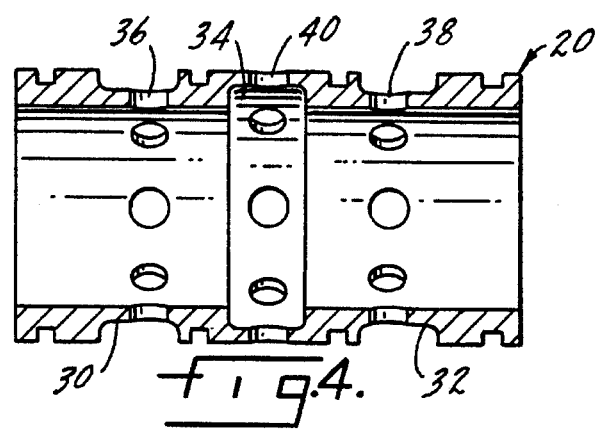
FIG. 4 is a section along plane 4—4 of FIG. 2.
Figure 5:
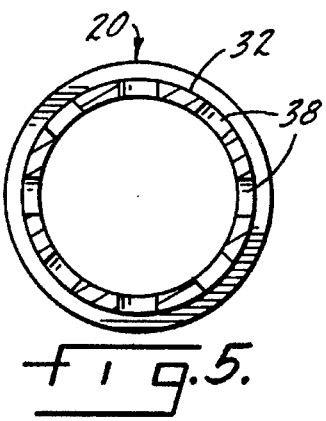
FIG. 5 is a section along plane 5—5 of FIG. 2.
Figure 6:
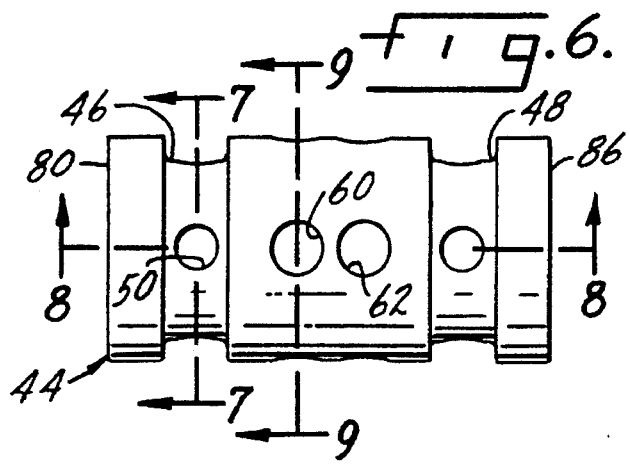
FIG. 6 is a side view of the valve member.
Figure 7:
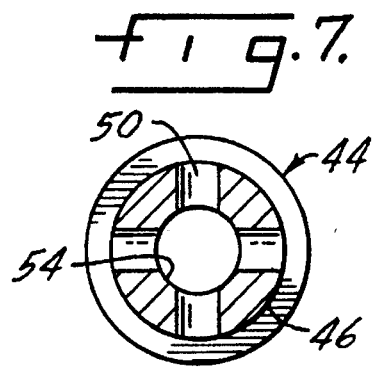
FIG. 7 is a section along plane 7—7 of FIG. 6.
Figure 8:
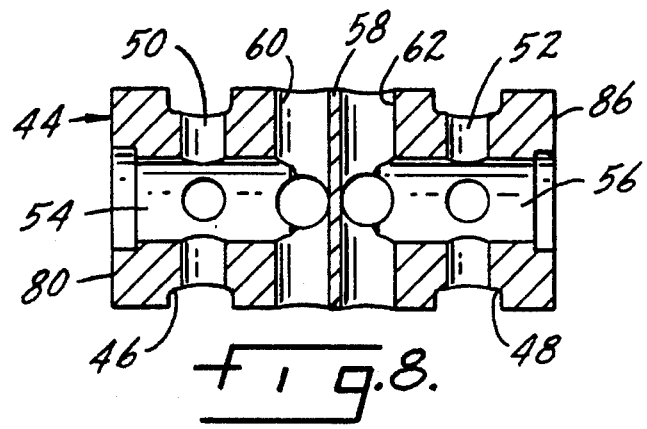
FIG. 8 is a section along plane 8—8 of FIG. 6.
Figure 9:
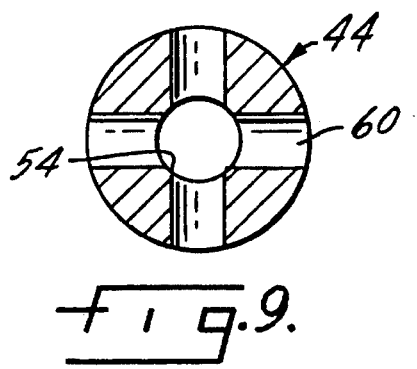
FIG. 9 is a section along plane 9—9 of FIG. 6.

The present invention is related to mixing valves in which water supply pressure is the activating energy to cause temperature modulation movement of the mixing valve element. Conventionally, mixing valves utilize a knob or a lever as the manual element to control volume and temperature. The present invention provides a hydraulically movable mixing valve member in which separate hot and cold operators, for example pushbuttons, are used to change the pressure on the mixing valve element to force its movement to a different temperature modulation position.

In the drawings, a housing is indicated generally at 10 and diagrammatically illustrates the housing of a mixing valve in which there are hot and cold water inlets 12 and 14, respectively, and a mixed water outlet 16. The shape of the housing as shown in the drawings is more diagrammatic than actual, however, the elements comprising the mixing valve itself are in usable form.

Positioned within the housing 10 is a chamber 18 which communicates with the hot and cold water inlets 12 and 14. Positioned within the chamber 18 is a sleeve 20 having exterior seal rings 22, 24, 26 and 28 which form a seal between the exterior of the sleeve 20 and the interior of the chamber, thus preventing cross flow between the inlets and between the inlets and the discharge from the sleeve chamber 18. Sleeve 20 has a peripheral groove 30 in register with the hot water inlet 12 and a peripheral groove 32 in register with the cold water inlet 14. The sleeve has an interior intermediate recess 34 which functions as a mixed water discharge as will be described hereinafter. There are a plurality of peripherally spaced ports 36 connecting recess 30 with the interior of sleeve 20 and there are similarly a plurality of peripherally spaced ports 38 connecting recess 32 with the interior of the sleeve. The outlet recess 34 has a series of peripherally spaced ports 40 which connect with a peripheral recess 42 in the interior of chamber 18, which recess functions to funnel the mixed water for discharge toward the housing outlet 16.

Positioned within sleeve 20 is a valve member 44 which is reciprocally movable to modulate the temperature of the water which is discharged through the mixing valve. Valve member 44 includes a peripheral recess 46 functioning as a hot water inlet and a peripheral recess 48 functioning as a cold water inlet. A plurality of peripherally spaced ports 50 and 52, respectively, connect with recesses 46 and 48 to direct incoming water into a hot water chamber 54 and a cold water chamber 56. Chambers 54 and 56 terminate on opposite sides of a divider 58 which separates the hot and cold water sides of the valve member 44. The chambers 54 and 56 each connect to outwardly directed passages 60 and 62, respectively, which will convey hot and cold water to the circumferentially extending recess 34 on the interior of sleeve 20. Thus, hot and cold water from the housing inlets 12 and 14 will pass through the described passages, chambers, and ports until such water reaches the opposite sides of divider 58 and then flows outwardly from the valve member into the circumferentially disposed recess in the sleeve. Sleeve recess 34 in turn is connected through ports 40 to recess 42 which directs the mixed water from the hot and cold water sides of the mixing valve into a housing passage 64.

Housing passage 64 connects to a cross passage 66 which has a flow restrictor 68 on the hot water side and a flow restrictor 70 on the cold water side. There is a further flow restrictor 72, which connects cross passage 66 with a further cross passage 74, which in turn connects to the housing outlet 16.

Water flowing from the mixed water discharge 64 will go through the three described flow restrictors, with the mixed water going through flow restrictor 72 directly to the housing outlet 16 from where it will be directed to a faucet spout or a shower/tub control as desired. Water flowing through flow restrictor 68 will pass through a passage 76 into a chamber 78 which faces the end wall 80 of valve member 44. The water in chamber 78 will apply pressure to move the valve member toward the right, as shown in the drawing. In like manner, water passing through flow restrictor 70 will pass through passage 82 into a chamber 84 which faces the right-hand end wall 86 of the valve member 44. Since end wall surfaces 80 and 86 are equal in cross sectional area, the water pressure applied to opposite sides, assuming a steady state condition for the mixing valve, will be equal and thus the valve member will be in a stable position within the sleeve 20.

Chamber 78 is connected by a passage 88 to a check valve 90 which may be manually operated by a pushbutton 92. Depression of button 92 causes the lips of the check valve to open, permitting water to flow from chamber 78, through the check valve, and into cross passage 74 adjacent housing outlet 16. In like manner, there is a passage 94 connecting chamber 84 with a check valve 96 operable by a manual pushbutton 98.

In operation, and assuming the valve member 44 is in the position shown, generally equal amounts of hot and cold water will pass to housing outlet 16. If it is desired to change the temperature of the water being discharged, and for purposes of example we will assume that it is desired to have less hot water in the mixed water discharge, pushbutton 92 is operated, opening check valve 90, which bleeds pressure from chamber 78 through passage 88 into cross passage 74. Because of flow restriction 72, the pressure in cross passage 74 is no greater than the pressure of water flowing from chamber 78 with the result that there is a decrease in pressure in chamber 78 causing valve member 44 to move to the left. Such movement will change the register between the hot and cold water inlet openings 36 and 38 in sleeve 20 and the recesses 46 and 48 on the exterior of valve member 44, as well as change the relative position of the divider 58 relative to sleeve interior recess 34. The result of such change in position is that the volume of cold water reaching outlet 16 has increased and the volume of hot water reaching outlet 16 has decreased.

Once the pushbutton 92 is released, closing check valve 90, pressure in chambers 78 and 84 will stabilize. The stabilized or pressure balanced condition will not be instantaneous, as flow restrictors 68 and 70 will control the rate of fluid flow into chambers 78 and 84. Thus, the change in water temperature will not be instantaneous, but will be somewhat modulated to reach the new desired level as determined by the length of time check valve 90 remains open. At such time as the pressure in chambers 78 and 84 has again equalized, providing equal and opposite pressure-created forces on equal cross sectional surfaces 80 and 86, valve member 44 will be stabilized in a new position in which the relative amounts of hot and cold water flowing through the valve will remain constant as long as the valve member remains in that position. Further activation of either check valve will again change the position of valve member 44 to change the temperature of water flowing through the housing outlet 16.

The position of valve member 44 will not change when water flow is shut off. In like manner, once water flow is again turned on, and assuming equal pressure in the hot and cold water supplies, the valve member 44 will remain in the position it was when water was turned off. The position of the valve member only changes when manual operation of the check valves reduces the pressure in one of the two pressure balancing chambers effecting movement of the valve member.

Of importance in the invention is the fact that movement of the mixing valve element uses water supply pressure as the energy for changing valve position. This eliminates the conventional knobs and levers commonly used in faucets and shower/tub controls. Often, knobs and levers require high actuation force. This is eliminated in the present invention, as the only thing that is required is the rather small force necessary to operate a pushbutton.

There are no dynamic seals. The valve can be mounted away from the outlet spout assembly to provide an increase in the style options for a faucet. The valve may be mounted on a counter with no exterior handles or levers; only conveniently located pushbuttons are necessary.

Whereas the preferred form of the invention has been shown and described herein, it should be realized that there may be many modifications, substitutions and alterations thereto.

The embodiments of the invention in which an exclusive property or privilege is claimed are defined as follows:

1. A hydraulically activated water pressure balanced mixing valve for use in faucets and shower/tub discharge controls including a valve sleeve having hot and cold water inlets and a mixed water discharge, a chamber within said valve sleeve, a valve member movably positioned within said chamber, said valve member having a hot water passage communicable with said sleeve hot water inlet and said sleeve mixed water discharge, and a cold water passage communicable with said sleeve cold water inlet and said sleeve mixed water discharge, a housing, said sleeve and valve member being positioned within said housing, an outlet in said housing connected to said sleeve mixed water discharge, generally equal pressure balancing surfaces on said valve member, passage means in said housing connected to said sleeve mixed water discharge and to each of said pressure balancing surfaces for applying water pressure onto said surfaces for causing water temperature modulation movement of said valve member within said sleeve, with such movement changing the relative communication between said sleeve hot and cold water inlets, mixed water discharge and said valve member passages, a passage connecting each of said pressure balancing surfaces with said housing outlet, and manually operable check valves in each passage connecting a pressure balancing surface and said housing outlet, operation of one of said check valves reducing the water pressure applied to one of said pressure balancing surfaces causing the valve member to move thereby changing the extent of communication of each of the sleeve hot and cold water inlets with the sleeve mixed water discharge to vary the water temperature thereof.

2. The mixing valve of claim 1 wherein said valve member has a closed wall at opposite ends thereof, said walls forming said pressure balancing surfaces.

3. The mixing valve of claim 1 wherein there is a flow restriction between said sleeve mixed water discharge and said housing outlet.

4. The mixing valve of claim 3 wherein there is a flow restriction in each passage means connecting said sleeve discharge and said pressure balancing surfaces.

5. The mixing valve of claim 4 wherein said passage means flow restrictions are each positioned upstream of said flow restriction between said sleeve discharge and said housing outlet.

6. The mixing valve of claim 5 wherein said check valve controlled passages connecting said pressure balancing surfaces and said housing outlet connect to said housing outlet downstream of the flow restriction between said sleeve mixed water discharge and said housing outlet.

7. The mixing valve of claim 1 wherein said valve member has a plurality of peripherally disposed hot water inlets, a plurality of peripherally disposed cold water inlets, a plurality of peripherally disposed hot water outlets, and a plurality of peripherally disposed cold water outlets, said valve member hot water passage connecting said valve member hot water inlets and hot water outlets, said valve member cold water passage connecting said valve member cold water inlets and said valve member cold water outlets.

8. The mixing valve of claim 1 wherein said valve member has a divider separating said valve member hot water passage and said valve member cold water passage.

9. The mixing valve of claim 8 wherein said valve member hot water outlets and cold water outlets are each adjacent said divider.

10. The mixing valve of claim 9 wherein said sleeve has a plurality of peripherally disposed hot water inlets and a plurality of peripherally disposed cold water inlets.

11. The mixing valve of claim 10 wherein said sleeve has an interior circumferentially extending passage communicable with said valve member hot water outlets and cold water outlets.

12. The mixing valve of claim 1 wherein there are seal elements between the exterior of said sleeve and said housing preventing cross flow of water between said sleeve hot and cold water inlets.

\* \* \* \* \*